United States Patent [19]

Kawada et al.

[11] Patent Number: 5,003,851
[45] Date of Patent: Apr. 2, 1991

[54] METHOD OF MANUFACTURING A PHOTORECEPTOR

[75] Inventors: Sunao Kawada; Takayoshi Hashimoto; Toyotsugu Itoh, all of Hachioji; Makoto Koyanagi, Fuchu, all of Japan

[73] Assignee: Konica Corporation, Tokyo, Japan

[21] Appl. No.: 423,024

[22] Filed: Oct. 18, 1989

[30] Foreign Application Priority Data

Oct. 20, 1988 [JP] Japan .................. 63-262837

[51] Int. Cl.[5] ........................................... B23B 3/00
[52] U.S. Cl. .................... 82/1.11; 407/117; 82/46
[58] Field of Search ................ 82/1.11, 46, 53; 407/117

[56] References Cited

U.S. PATENT DOCUMENTS

| 3,846,880 | 7/1978 | Föll et al. | 82/117 |
| 4,132,493 | 1/1979 | Hosoi | 407/53 |
| 4,818,153 | 4/1989 | Strandell et al. | 407/118 |

Primary Examiner—Frederick R. Schmidt
Assistant Examiner—Lawrence Cruz
Attorney, Agent, or Firm—Finnegan, Henderson, Farabow, Garrett, and Dunner

[57] ABSTRACT

In a method of manufacturing a photoreceptor base drum by a lathe-turning machine in which a cutting tool is brought in contact with a surface of the base drum and travels in the axial direction to finish the surface of the base drum into a mirror-like surface, a main cutting edge formed by a rake surface and a front flank surface on the cutting tool is shaped as a curved surface with a radius of curvature of 0.15 to 3.5 μm, and the rake surface and the front flank surface are shaped to smoothly continue to the curved surface of the main cutting edge.

9 Claims, 3 Drawing Sheets

METHOD OF MANUFACTURING A PHOTORECEPTOR

BACKGROUND OF THE INVENTION

The present invention relates to a manufacturing method for a photoreceptor base drum which is applied to various kinds of image recording apparatuses such as an electrophotographic copier, a printer, a facsimile, and the like.

The electrophotographic process is used to record images in recording apparatuses such as an electrophotographic copier, a laser printer, and a digital computer. In the electrophotographic process, an electrostatic latent image is formed on a photoreceptor by exposing a uniformly electrified photoreceptor to light corresponding to the image information. The latent image is developed and transferred to a recording paper. After that, the transferred paper is heated for fusing, and finally the image is formed on the recording paper. Various kinds of materials are used for the photoreceptor. An organic semiconductor with photoconductivity is used by forming a substrate layer, an electric charge generation layer, and an electric charge transport layer in order to form a light-sensitive layer on the surface of a cylindrical drum base which is usually made from nonferrous metals such as aluminum and copper, or nonmetallic materials such as plastics. Furthermore, inorganic light-sensitive materials such as CdS and ZnO on which an insulating layer and a protective layer are coated, or vapor-deposited amorphous selenium and amorphous silicon are used as the photoreceptor materials.

The surface of the drum base must be smooth because electrostatic latent images and visual images are formed on this kind of photoreceptor drum. Recently, the surface of a photoreceptor has been cut by a diamond, tool or a diamond bit to accomplish mirror-finishing. A diamond tool resists abrasion and wears at a low rate because it is hard and can withstand high temperatures. Therefore, the diamond tool can finish each part accurately and make a smooth mirror-finished surface easily, and is suited for cutting the surface of a photoreceptor drum base.

However, in the case of a newly ground diamond tool, a major cutting edge formed by a rake face and a flank and a minor cutting edge formed by the face and a side flank are extremely sharp. In addition, the diamond tool may have defects which occurred during grinding, and scratches on the diamond tool caused in grinding. As a result, while the diamond tool is cutting the photoreceptor drum base, material cut from it tends to form a deposit on the sharp and defective cutting edge while cutting is conducted, and then the cutting edge tends to fall off. It is known that the diamond tool damages the surface to be machined and a good mirror-finished surface can not be obtained for the reasons mentioned above.

Conventionally a dummy material is cut by a diamond tool before it is used, in what is called the break-in. A sharp diamond tool, after being ground, usually cuts a dummy material for the break-in to wear the sharp cutting edge adequately, and then the diamond tool starts mirror-finishing the surface of actual materials. A high quality cutting edge is obtained by cutting a dummy material with the diamond tool for the break-in period to eliminate the defects of the tool which were caused while the tool was being ground. As a result, excellent cutting and burnishing can be conducted on a work surface and a smooth mirror-finished surface can be formed.

However, in order to conduct the break-in cutting of a new diamond tool, it is necessary to cut a substitute work surface with the tool for 10Km to 100Km. Furthermore, it is necessary to change the angle between the tool and the work surface many times during the break-in. In order to get a cutting tool with an efficient cutting edge, a great deal of time and work are needed, which decreases productivity.

It is thus desirable to eliminate the break-in of a cutting tool and to get a high quality cutting edge from the start of cutting. For example, according to Japanese Patent Publication Open to Public Inspection No. 271605/1987, as shown in FIG. 8, it is proposed to install a chamfer with the width of 0.2 to 0.8μm on the major cutting edge which is formed by the face 11a and the front flank 11b of the cutting tool 11. However, the chamfered cutting tool mentioned above can not conduct mirror-finishing on the work surface from the start of cutting, but merely reduces the break-in period, and it also is difficult to form a mirror-finished surface stably on the work surface by this method from the start.

When break-in cutting is not conducted sufficiently or slight scratches are left on the surface of the drum base due to the initial surface conditions of the cutting tool, lubricating oil or minute particles are left in the scratches even after the drum base is washed, or dust in the air sticks in the scratches. When a photoreceptor is made by forming the above-mentioned light-sensitive layer on the drum surface in this condition and it is installed in an apparatus, its image quality is degraded as the scratches on the photoreceptor surface can cause electrical leaks when it is charged or cause image blur or interference fringes when an image is recorded. The light-sensitive layer is generally considered to be better when thinner. But, when the mirror-surface can not be obtained on the surface of the drum base, it is difficult to reduce the thickness of the light-sensitive layer. When the layer is thick, it brings about efficiency degradation.

SUMMARY OF THE INVENTION

In view of the foregoing, it is the object of this invention to manufacture a photoreceptor drum base with a mirror-finished surface on which a high quality image can be formed, by setting a diamond tool in a lathe turning machine almost without break-in cutting or with a short break-in cutting. In order to accomplish the object, a mirror-finished surface is formed on the surface of a photoreceptor by cutting the photoreceptor drum base with a diamond cutting tool, whose details will be described as follows. The surface of the photoreceptor drum base is mirror-finished by the diamond cutting tool, wherein the major cutting edge of the tool formed by the face and the front flank, is formed by a curved surface with a radius of curvature of 0.15 to 3.5μm, which curves smoothly and continuously into the face and front flank.

DESCRIPTION OF THE PREFERRED EMBODIMENTS

A method of manufacturing a photoreceptor drum base of the present invention will be described as follows.

As an example, a photoreceptor drum base made from aluminum is considered here. For instance, an aluminum tube which is about 1mm thick, produced by a drawing method or extrusion method, and cut to a prescribed length (for example 300mm) is provided as a photoreceptor drum base material.

Figure 1:
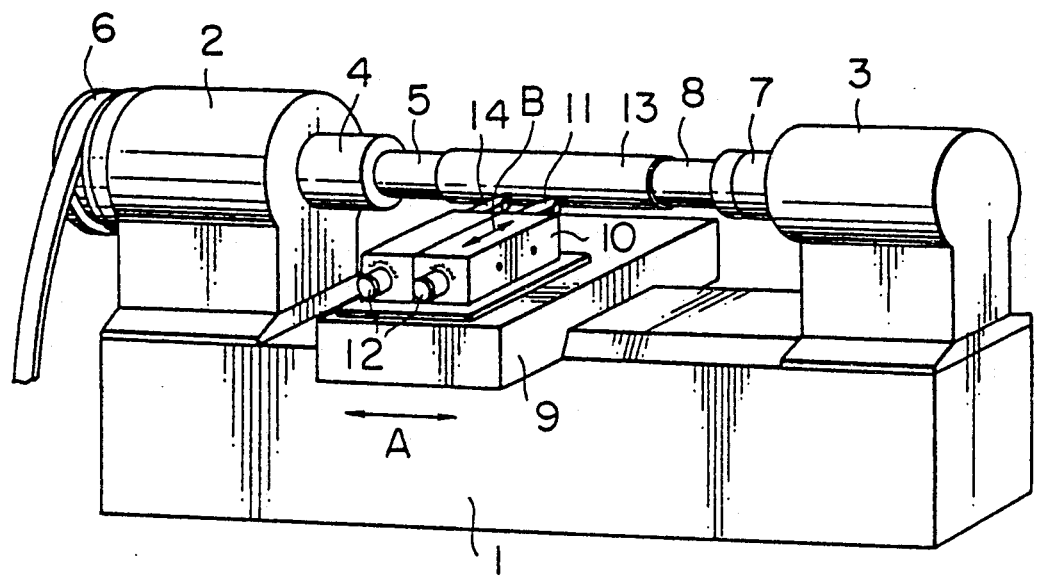
FIG. 1 is a schematic illustration of a lathe turning machine used in the manufacturing method of a photoreceptor drum base of the present invention.

FIG. 1 shows a general view of a lathe turning machine used in the present invention. The headstock 2 and the tailstock 3 are mounted on the bed 1 of the lathe turning machine. The chuck 5 is fixed to the main spindle 4 which is installed in the headstock 2. The belt 6 is wound around the pulley which is directly connected with the main spindle 4 and driven by a motor not shown in the drawing.

On the other end, the tailstock spindle 7 is installed at the tailstock 3 and the chuck 8 is fixed to the tip of the tailstock spindle.

The saddle 9 is movably mounted on the bed 1 between the headstock 2 and the tailstock 3 and can perform a reciprocating motion in the directions of the arrow A. The tool post 10 is movably mounted on the saddle 9 and can move in the directions of the arrow B which makes a right angle with the saddle moving direction. The cutting tools 11 and 14 are mounted in the front portion of the tool post 10 and they are capable of being installed and removed from the rear side of the tool post 10, on which the adjusting knobs 12 are installed.

When the surface of a photoreceptor drum base is to be mirror-finished, the chuck 5 comes into contact with the aperture of one end of the photoreceptor drum base 13, the surface of which is to be machined, in the state that the tailstock 7 is withdrawn, and the other chuck 8 comes into contact with the aperture of the other end of the photoreceptor drum base 13. After that, the drum base 13 is pressed from both sides by pushing out the tailstock spindle 7.

The photoreceptor drum base 13 fixed to the lathe turning machine in this way is rotated by a motor through the belt 6. The rough cutting tool 14 mounted at a desired height on the tool post 10 cuts into the drum base at a constant depth. Then the saddle 9 is moved at a constant speed from the left end to the right. When the rough cutting tool goes over the total length of the drum base, the saddle 9 stops and the rough cutting tool 14 is withdrawn. Then, while the finishing tool 11 is coming into contact with the surface of the drum base, the saddle 9 is fed at a constant slow speed in the left direction. When the finishing tool 11 reaches the left end of the drum base, the saddle 9 returns to the initial left position. The surface of the drum base 13 is being mirror-finished by the finishing tool 11 (This tool is called a cutting tool or a diamond tool in this specification from now on.) through these reciprocating motions.

Figure 2:
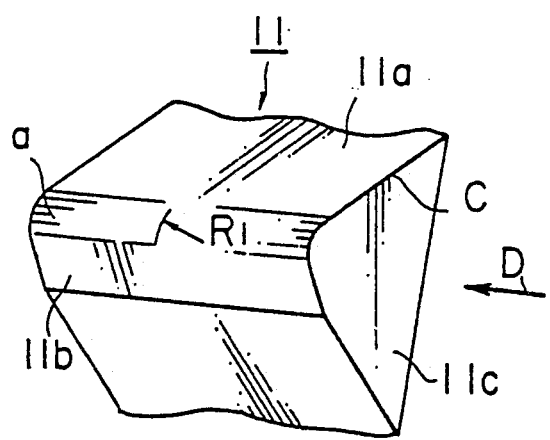
FIG. 2 is a perspective view of an example of a cutting tool tip used in the manufacturing method of the present invention.
Figure 3:
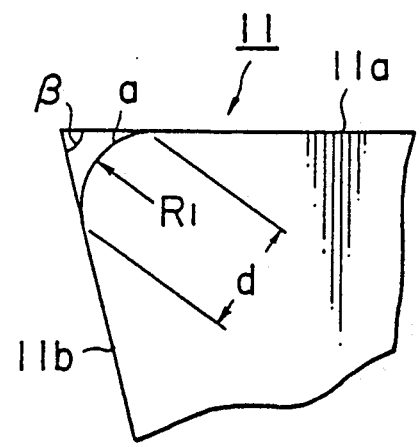
FIG. 3 is an external view of the cutting tool tip shown in FIG. 2, wherein the cutting tool is viewed from the direction of arrow D.

FIG. 2 shows the main portion of the tool tip of a diamond cutting tool example used in the above-mentioned lathe turning machine. FIG. 3 is a side view of the same tool tip viewed from the direction of arrow D in FIG. 2.

As shown in FIG. 3, a cutting tool is prepared whose angle $\beta$ which is formed by the face 11a and the front flank 11b, is 85°. The major or mean cutting edge a which is formed by the face 11a and the front flank 11b is ground to form a curved surface whose radius of curvature is $0.8\mu m$. The major cutting edge a forms a similar curved surface to that of a major cutting edge which has undergone break-in cutting. The curved surface smoothly continues into the face 11a and the front flank 11b. The distance d (Refer to FIG. 3.) between two inflection points is $2.2\mu m$, wherein one point is the connecting point of the major cutting edge a and the face 11a and the other point is the connecting point of the major cutting edge a and the front flank 11b.

On the other hand, the face 11a and the side flank 11c intersect and form the minor cutting edge c, which is sharp.

The radius of curvature $R_1$ of the curved surface composing the major cutting edge is preferably 0.15 to $3.5\mu m$ and more preferably 0.5 to $3.0\mu m$ for machining. When the radius of curvature $R_1$ is smaller than $0.15\mu m$, the cutting edge is still sharp, and there are quite a few unstable factors such as defects in the cutting edge. Therefore, a good mirror-finished surface can not be obtained by cutting with the tool. On the other hand, when the radius of curvature exceeds $3.0\mu m$, especially $3.5\mu m$, cutting edge wear becomes excessive and tool life becomes short. It was experimentally confirmed that an especially excellent mirror-finished surface could be obtained when a radius of curvature $R_1$ is determined to be 0.70 to $0.80\mu m$.

Figure 4:
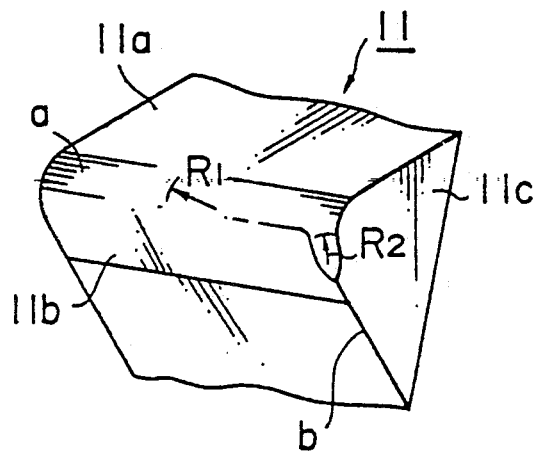
FIG. 4 and FIG. 5 are perspective views of other examples of cutting tools used in the manufacturing method of the present invention.

FIG. 4 is a perspective view of a cutting tool tip of another example of the present invention. The numbers in FIG. 4 which are the same as those shown in FIG. 2 represent the same portions of the cutting tool.

In this example, the major cutting edge a which is formed between the face 11a and the front flank 11b, is a curved surface with a radius of curvature $R_1=0.8\mu m$. Furthermore, the front flank 11b and the side flank 11c intersect and form an edge, which is a curved surface with a radius of curvature $R_2=0.09mm$. It is preferable to have a radius of curvature $R_2$ on that surface within the range of 0.02 to 0.2mm. The face 11a and the side flank 11c intersect and they form the minor or sub cutting edge c, which is sharp.

The curved surface of the cutting edge b is formed over the length of 10 to $40\mu m$ from the face to the flank.

Figure 5:
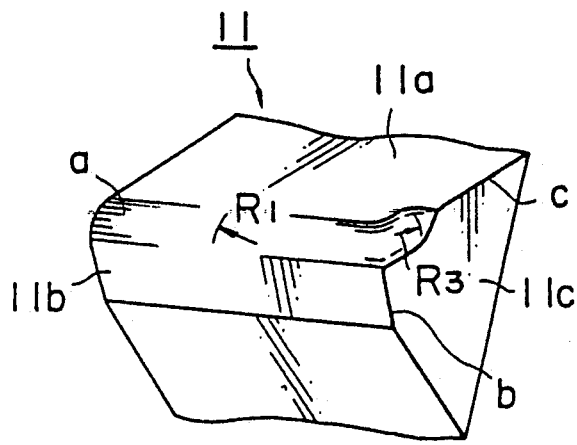

FIG. 5 is a perspective view of a cutting tool tip of another example of the invention. The numbers in FIG. 5 which are the same as those in FIG. 4 represent the same portions of the cutting tool.

This example is a variation of the example shown in FIG. 2 in which a curved surface with a radius of curvature $R_3=0.3\mu m$ is formed over a length of 0.2mm on the minor cutting edge c which is made by the face 11a and the side flank 11c. In this case, the radius of curvature $R_1$ of the major cutting edge a is the same as that of the example shown in FIG. 2. As mentioned before, the major cutting edge a continues smoothly to the minor cutting edge b or c in a continuation of a radius of curvature. It is preferable that the major cutting edge a and the minor cutting edges b or c, or the curved surfaces a, b, and c are formed by smooth continuous surfaces. It is preferable to determine a radius of curvature $R_3$ on the curved surface within the range of 0.1 to 0.3μm. In each example, a drum base is burnished satisfactorily by the cutting tool because the major cutting edge a which forms a curved surface continues smoothly to the front flank 11b. Accordingly, the cutting tool never develops any defects, such as a streak on the work surface. In order to obtain an excellent mirror-finished surface from the beginning of cutting, it is most suitable that the major cutting edge a continues smoothly to the front flank 11b forming a smoothly curved surface without a sharp edge. Since the edge b where the front flank 11b and the side flank 11c meet contacts the work surface, it is preferable for the edge b to have a larger radius of curvature than the curved surface of the cutting edge a. The minor cutting edge c where the face 11a and the side flank 11c meet preferably has a smaller radius of curvature than the curved surface of the major cutting edge a.

Furthermore, when a curved surface with a radius of curvature such as $R_2$ and $R_3$ in the examples shown in FIG. 4 and FIG. 5, is formed on the edges b and c in the examples shown in FIG. 4 and FIG. 5, efficiency of each example is multiplied several fold and an excellent cutting tool can be obtained.

A cutting tool of the present invention was mounted on a shank. Then, the cutting tool was set in the lathe turning machine shown in FIG. 1 and a cutting test was conducted under the conditions as follows.

Work material: Aluminum alloy for a photoreceptor drum base ( A 1070, A 3003)

Revolution speed : 3000 rpm

Feed per revolution: 0.2 mm/rev.

Depth of cut : 20 μm

Figure 8:
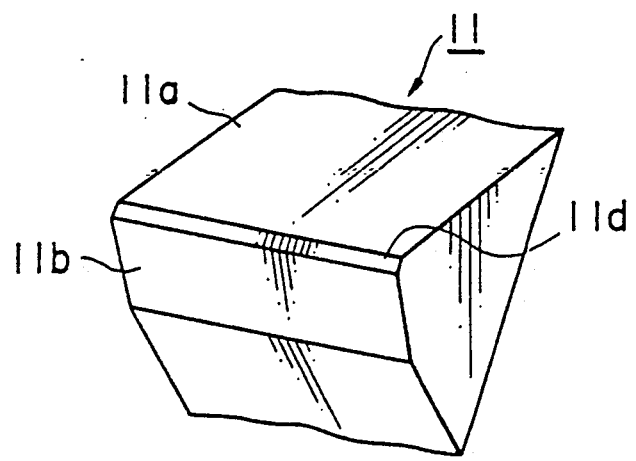
FIG. 8 is a perspective view of the conventional type cutting tool tip.

In order to make a comparison, two types of cutting tools were prepared and tested under the same conditions. One was a cutting tool whose major cutting edge a and minor cutting edge c were not curved surfaces but sharp edges formed by grinding. (This cutting tool was defined as the conventional type example 1.) The other was a cutting tool whose major cutting edge a was chamfered over the total length and the width of the chamfer 11d was 2.2 μm. The chamfered portion of the cutting tool is represented by 11d in FIG. 8. (This cutting tool was defined as the conventional type example 2.)

In this test, cutting was continued until an excellent mirror-surface was obtained by each cutting tool and each cutting distance was figured out. The results are as follows. The cutting distance is expressed by the break-in cutting distance.

| Tested cutting tool | Break-in cutting distance |
| --- | --- |
| The present invention | 0 to 10 km (The average of 10 samples = 3 km) |
| The conventional type example 1 | 80 to 150 km |
| The conventional type example 2 | 50 to 100 km |

Although aluminum alloy was used as the material for a photoreceptor drum base in the above-mentioned experiment, the same tendency was recognized when a pure aluminum material was used in the experiment.

It is clear from the results of the experiment that the break-in cutting time necessary to obtain a high quality mirror-surface can be greatly reduced by employing the manufacturing method of the present invention.

A transferred image was evaluated which was made by using a photoreceptor with a light-sensitive layer on the drum base such as a photoconductive organic semiconductor or selenium photoconductor (the foundation layer: 0.1 to 1 μm, the charge generation layer: 0.1 to 2 μm, the charge transport layer: 10 to 30 μm). Electrical leakage was not recognized, which generally tends to occur under conditions of electrostatic charge and a high quality image with no defects, such as image blur, was obtained.

Figure 6:
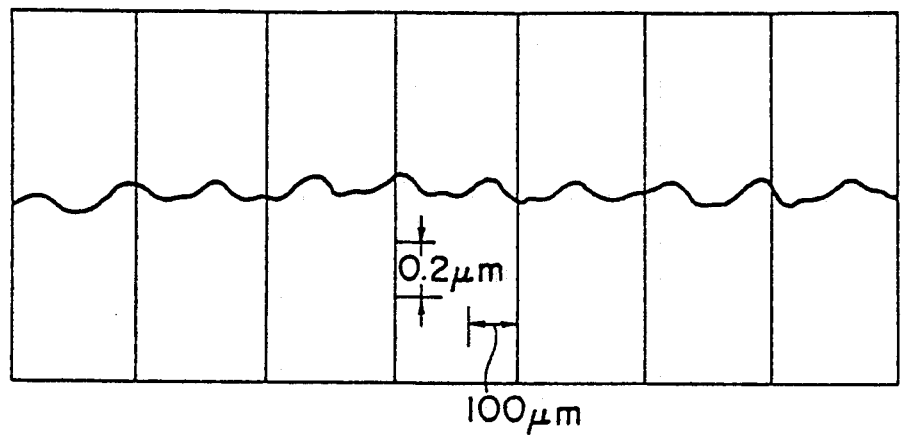
FIG. 6 and FIG. 7 are charts of surface roughness of the drum bases which were manufactured by the method of the present invention and the conventional method.
Figure 7:
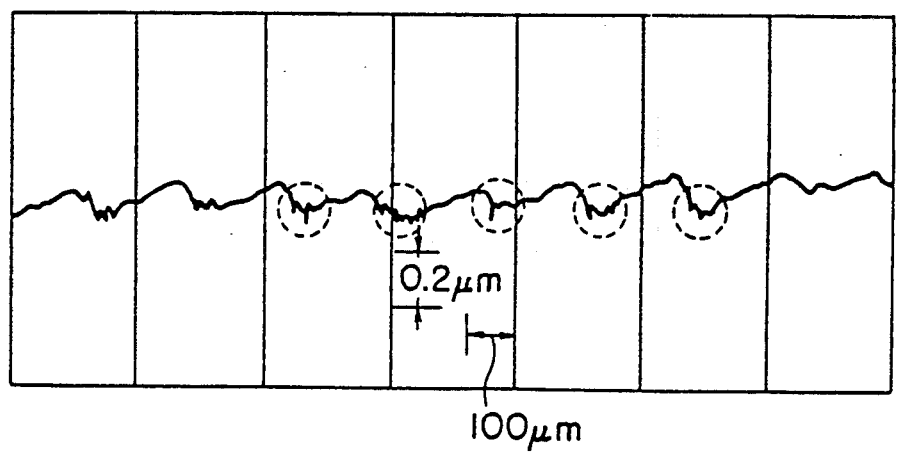

FIG. 6 and FIG. 7 show the results of surface roughness of photoreceptor drum bases measured by the tracer method. The measurement was conducted on the first and/or second photoreceptor drum bases manufactured by the method of the present invention and the conventional method. The surface roughness was measured with the tracer method surface roughness tester. It can be understood from FIG. 6 relating to the present invention that scratches are hardly recognized on the drum base surface. But, in FIG. 7 relating to the conventional method, many scratches per unit length can be found on the drum base surface as indicated by broken line circles on the graph. This shows that a high quality mirror-finished surface with few scratches can be obtained by the photoreceptor drum base of the present invention. In other words, compared with the processing method using the conventional cutting tool which was formed by break-in cutting and has a cutting edge with an irregular radius of curvature, the tool life for which the tool can be used for cutting a mirror-finished surface becomes longer with the present invention. Because the radius of curvature of a cutting edge is uniform, many photoreceptors can be obtained which are uniformly made with less flaws on the processed surface and less unevenness of the pitch of cutting tool traces. This method also saves time in the later coating process, and a uniformly thin and even light-sensitive layer can be formed stably.

The present invention is not limited to manufacturing a drum base made from aluminum and aluminum alloy. It can also be applied to manufacture of a photoreceptor made from non-ferrous metals such as copper, beryllium, nickel, and gold, and furthermore made from non-metals such as synthetic resin.

The photoreceptor drum base made by the method of the present invention is not limited only to a cut pipe manufactured by the drawing method or the extrusion molding method as shown in the example. The present invention may also be applied to a pipe made by, for example, a drawing method in which one end is closed.

The radii of curvature $R_1$, $R_2$, and $R_3$ which are formed on the major cutting edge a or the minor cutting edges b and c, can either be changed longitudinally with regard to the cutting edge or be formed on a portion without spreading over the total length of the cutting edge.

As is publicly known, a cutting tool is used in a prescribed cutting direction with regard to the work piece. In the examples shown in FIG. 4 and FIG. 5, the cutting tool cuts the work surface when it is moved in the left direction. It is needless to say that in the present invention the cutting tool can cut the work surface when the tool is moved in the right direction if the curved surface is made on the opposite cutting tool edge instead of the cutting edge shown in the drawings. In this explanation, an ordinary lathe turning machine was used as an example of an apparatus to cut the surface of a photoreceptor drum base. But the cutting apparatus is not limited to a lathe turning machine. An NC lathe, a machining center, and the like can also be used.

As explained above, in the present invention, the surface of a photoreceptor drum base is cut to obtain a mirror-finished surface by a diamond cutting tool, whose major cutting edge formed by the face and the front flank forms a curved surface with a radius of curvature of 0.15 to 3.5 µm, which curves smoothly and continuously into the face and front flank. For that reason, a high quality mirror-finished surface can be obtained without conducting break-in cutting or with an extremely short break-in cutting. The cutting tool of the present invention usually needs to be mounted on a lathe turning machine only once and this leads to a reduction of man-hours for setting. Because break-in cutting is not needed for the cutting tool of the invention, material loss is reduced. As a result, the production cost to cut a mirror-finished surface on the photoreceptor drum base made from non-ferrous metal or non-metal, can be remarkably reduced.

According to the present invention, compared with the conventional method, a little break-in cutting is sufficient to obtain a high quality mirror-finished surface. Therefore, scratches on the drum base decrease sharply. When the drum base is used as the photoreceptor of an image recording apparatus, electrical leakage by the pole of static electric charge, caused by many small scratches on the drum, and image blur, caused by light diffusion at small irregular portions on the drum base when exposure is conducted in image recording, can be eliminated and a high quality recording image can be obtained. Previously, when these scratches became clogged by minute particles, or detergent used in cutting (e.g. trichloroethylene sold under the trademark TRICHLENE), it was necessary to strengthen the adherent force between the base and the lightsensitive layer by making the foundation layer thick. But, it has become possible to manufacture a light-sensitive drum with a thin foundation layer. Accordingly, it has become possible to manufacture a thin light-sensitive layer by using the drum base made by the method of the present invention. Of course, the characteristics of the photoreceptor residual voltage are improved. The interference fringe is reduced which occurs especially when image recording is conducted by dot exposure such as laser and LED. Therefore, the present invention contributes to improvements of image quality of the laser printer and the digital copier.

What is claimed is:

1. A method of finishing the surface of a photoreceptor base drum by using a lathe-turning machine, the method comprising the steps of:
    providing a cutting tool having a rake surface, a front flank surface, and a main cutting edge defined by at least a portion of the juncture of the rake surface and the front flank surface, the main cutting edge including a curved surface having a radius of curvature in the range of about 0.15 to 3.5 µm;
    rotating the photoreceptor base drum on its axis in the lathe turning machine;
    positioning the curved surface of the main cutting edge into cutting engagement with the surface of the rotating photoreceptor base drum; and
    moving the engaged cutting tool in the axial direction of the rotating photoreceptor base drum for providing the surface of the photoreceptor base drum with a mirror-like finish.

2. The method of claim 1, wherein the step of providing the cutting tool includes providing a cutting tool wherein the curved surface of the main cutting edge has a radius of curvature which varies along the length of the main cutting edge.

3. The method of claim 1, wherein the step of providing the cutting tool includes providing a cutting tool wherein the curved surface of the main cutting edge extends over the total length of the main cutting edge.

4. The method of claim 1, wherein the step of providing the cutting tool further includes providing a cutting tool having at least one side flank surface, and a primary sub cutting edge defined by at least a portion of the juncture of the front flank surface and the at least one side flank surface, the primary sub cutting edge including a curved surface having a radius of curvature in the range of about 0.02 to 0.2 µm, and the step of positioning further includes positioning the curved surface of the primary sub cutting edge into cutting engagement with the rotating surface of the base drum.

5. The method of claim 4, wherein the step of providing the cutting tool includes providing a cutting tool wherein the radius of curvature of the curved surface of the primary sub cutting edge varies along the length of the primary sub cutting edge.

6. The method of claim 4, wherein the step of providing the cutting tool includes providing a cutting tool wherein the curved surface of the primary sub cutting edge extends over the total length of the primary sub cutting edge.

7. The method of claim 1, wherein the step of providing the cutting tool further includes providing a cutting tool having at least one side flank surface, and a secondary sub cutting edge defined by at least a portion of the juncture of the rake surface and the at least one side flank surface, the secondary sub cutting edge including a curved surface having a radius of curvature in the range of about 0.1 to 0.3 µm, and the step of positioning further includes positioning the curved surface of the secondary sub cutting edge into cutting engagement with the rotating surface of the base drum.

8. The method of claim 7, wherein the step of providing the cutting tool further includes providing a cutting tool wherein the radius of curvature of the curved surface of the secondary sub cutting edge varies along the length of the secondary sub cutting edge.

9. The method of claim 7, wherein the step of providing the cutting tool further includes providing a cutting tool wherein the curved surface of the secondary sub cutting edge extends over the total length of the secondary sub cutting edge.

* * * * *